Patented June 1, 1926.

1,587,435

UNITED STATES PATENT OFFICE.

OTTO STAEHLIN, OF HOCHST-ON-THE-MAIN, GERMANY, ASSIGNOR, BY MESNE ASSIGNMENTS, TO GRASSELLI DYESTUFF CORPORATION, OF NEW YORK, N. Y., A CORPORATION OF DELAWARE.

BLUISH-GREEN DYESTUFFS AND COLOR LAKES THEREFROM AND PROCESS OF MAKING SAME.

No Drawing. Application filed December 18, 1924, Serial No. 756,825, and in Germany December 24, 1923.

United States Patent No. 1,031,823 describes the preparation of green coloring matters or dyestuffs by treating the sulfonic acids of 1.2-naphthylenediamine, particularly the unsubstituted 1.2-naphthylenediamine 5 or 3 mono sulfonic acids, with ferric salts and the preparation of color lakes from such coloring matters or dyestuffs. The conversion of the dyestuffs into color lakes, however, involves considerable difficulty in practice due to the fact that the said dyestuffs are very difficultly soluble. The introduction of additional sulfonic acid groups into the dyestuffs referred to for the purpose of increasing their solubility has the disadvantage that the color lakes prepared therefrom are not sufficiently insoluble in water.

Now I have found that by introducing halogen into the naphthalene nucleus the solubility of the dyestuffs in question is considerably enhanced, whilst on the other hand the insolubility of the lakes prepared therefrom is not affected. The dyestuffs may be prepared by treating halogen-1.2-naphthylenediamine sulfonic acids with ferric salts. The dyestuffs thus obtained are superior to the dyestuffs described in U. S. specification No. 1,031,823 not only by their bright and bluer shade but also particularly by their considerably better solubility. They are particularly suitable for the preparation of color-lakes which can be made in the usual manner. The dyestuffs are green powders soluble in water and in concentrated sulfuric acid with the same color, but insoluble in most of the organic solvents, and dye wool green tints but do not dye cotton. The lakes are green powders of a more bluish tint than the corresponding unhalogenated color lakes.

The following examples illustrate my invention:

1. 27 kilos of 8-chloro-1.2-naphthylenediamine-5-sulfonic acid—obtained for instance by coupling 8-chloro-1-naphthylamine-5-sulfonic acid with diazobenzene chloride and reducing the resulting azo dyestuff—are dissolved in 500 litres of water and 5.3 kilos of sodium carbonate and after having added 13.6 kilos of sodium acetate the mixture is treated with a solution of 40 kilos of ferric chloride whereupon the dyestuff immediately separates. In a dry state it forms a powder which is readily soluble in water to a greenish-blue solution. Its solution in concentrated sulfuric acid is also bluish-green.

2. A solution of 5 kilos of sulfate of ammonia of 18 per cent in 50 litres of water and a solution of 2 kilos of calcined sodium carbonate in 20 litres of water are mixed with 30 kilos of sulfate of barium. To this mixture is added a solution in 100 litres of water of 3 kilos of the dyestuff (obtainable according to example 1) from 1.2-naphthylenediamine-8-chloro-5-sulfonic acid and ferric chloride, and furthermore a solution of 9 kilos of crystallized barium chloride in 90 litres of water. The resulting color-lake is pressed off and used either in this state as a paste or after being dried.

I claim:

1. Process of producing bluish green dyestuffs which comprises treating a halogenated 1.2-naphthylenediamine sulfonic acid with a soluble ferric salt.

2. Process of producing bluish green dyestuffs which comprises treating a halogenated 1.2-naphthylenediamine mono-sulfonic acid with a soluble ferric salt.

3. Process of producing bluish green dyestuffs which comprises treating an 8-halogen-1.2-naphthylenediamine sulfonic acid with a soluble ferric salt.

4. Process of producing bluish green dyestuffs which comprises treating an 8-halogen-1.2-naphthylenediamine mono-sulfonic acid with a soluble ferric salt.

5. Process of producing a bluish green dyestuff which comprises treating 8-halogen-1.2-naphthylenediamine-5-sulfonic acid with a soluble ferric salt.

6. As new products, coloring matters substantially identical with those produced by the hereindescribed process which consists essentially in treating halogenated 1.2-naphthylenediamine sulfonic acid with soluble ferric salts, said dyestuffs being green powders soluble in water and in concentrated sulfuric acid to green colored solutions but insoluble in most of the organic solvents, and dyeing wool green tints but not dyeing cotton.

7. As a new product the coloring matter obtainable by treating 8-chloro-1.2-naphthylenediamine-5-sulfonic acid with soluble ferric salts, being a bluish-green powder, soluble in water, concentrated sulfuric acid and methyl alcohol with the same color, insoluble in ethyl alcohol, acetone, ether, benzene, chloroform and naphtha, dyeing wool bluish-green tints, not dyeing cotton.

8. As new products, color lakes comprising water insoluble salts of dyestuffs substantially identical with those produced by the hereindescribed process which consists essentially in treating halogenated 1.2-naphthylenediamine sulfonic acids with soluble ferric salts, said color lakes being green powders of a more bluish tint than the corresponding unhalogenated color lakes.

In testimony whereof, I affix my signature.

DR. STAEHLIN, OTTO.